US012511728B2

(12) United States Patent
Rashidi et al.

(10) Patent No.: US 12,511,728 B2
(45) Date of Patent: Dec. 30, 2025

(54) METHOD FOR AUTONOMOUSLY APPLYING A DANGLING BOND PATTERN TO A SUBSTRATE

(71) Applicant: Quantum Silicon Inc., Edmonton (CA)

(72) Inventors: Mohammad Rashidi, Edmonton (CA); Jeremiah Croshaw, Edmonton (CA); Robert Wolkow, Edmonton (CA)

(73) Assignee: Quantum Silicon Inc., Edmonton (CA)

( * ) Notice: Subject to any disclaimer, the term of this patent is extended or adjusted under 35 U.S.C. 154(b) by 612 days.

(21) Appl. No.: 17/429,443

(22) PCT Filed: Feb. 14, 2020

(86) PCT No.: PCT/CA2020/050200
§ 371 (c)(1),
(2) Date: Aug. 9, 2021

(87) PCT Pub. No.: WO2020/163967
PCT Pub. Date: Aug. 20, 2020

(65) Prior Publication Data
US 2022/0130033 A1    Apr. 28, 2022

Related U.S. Application Data

(60) Provisional application No. 62/806,381, filed on Feb. 15, 2019.

(51) Int. Cl.
*G06T 7/00* (2017.01)
*G01Q 30/04* (2010.01)
*G01Q 60/10* (2010.01)

(52) U.S. Cl.
CPC ........... *G06T 7/0008* (2013.01); *G01Q 30/04* (2013.01); *G01Q 60/10* (2013.01);
(Continued)

(58) Field of Classification Search
CPC ......... G06T 7/0008; G06T 2207/10061; G06T 2207/20081; G06T 2207/20084;
(Continued)

(56) References Cited

U.S. PATENT DOCUMENTS 12,153,653 B2 * 11/2024 McCrackin ........... G06T 7/0004
12,183,066 B2    12/2024 Karlinsky et al.
(Continued)

FOREIGN PATENT DOCUMENTS

CA        2323850        4/2002
KR     20170074812 A     6/2017
(Continued)

OTHER PUBLICATIONS

Int'l Search Report for PCT/CA2020/050200, dated May 7, 2020.
Office Action issued in corresponding Korean Appln. No. 10-2021-7025725, dated May 27, 2025.

*Primary Examiner* — Hwa Andrew Lee
(74) *Attorney, Agent, or Firm* — MaxGoLaw PLLC

(57) ABSTRACT

A method for autonomously applying a dangling bond pattern to a substrate for atom scale device fabrication includes inputting the pattern, initiating a patterning process, scanning the substrate using a scanning probe microscope (SPM) to generate an SPM image of the substrate, feeding the SPM image into a trained convolution neural network (CNN), analyzing the SPM image using the CNN to identify substrate defects, determining a defect free substrate area for pattern application; and applying the pattern to the substrate in that area. An atom scale electronic component includes functional patches on a substrate and wires electrically connecting the functional patches. Training a CNN includes recording a Scanning Tunneling Microscope (STM) image of the substrate, extracting images of defects from the STM image, labeling pixel-wise the defect images, and feeding (Continued)

the extracted and labeled images of defects into a CNN to train the CNN for semantic segmentation.

6 Claims, 16 Drawing Sheets

(52) U.S. Cl.
CPC ............... *G06T 2207/10061* (2013.01); *G06T 2207/20081* (2013.01); *G06T 2207/20084* (2013.01); *G06T 2207/30148* (2013.01)

(58) Field of Classification Search
CPC .......... G06T 2207/30148; G01Q 30/04; G01Q 60/10; G06N 3/045; G06N 3/048; G06N 3/08; G06N 3/02; B82B 3/0019; B82B 3/00; H01L 29/02; B82Y 40/00
See application file for complete search history.

(56) References Cited

U.S. PATENT DOCUMENTS

| | | | |
|---|---|---|---|
| 2010/0255194 A1* | 10/2010 | Gorman | .................... C07K 7/00 |
| | | | 427/256 |
| 2017/0292923 A1 | 10/2017 | Baralia et al. | |
| 2020/0034956 A1* | 1/2020 | Machek | ............... G06V 10/774 |
| 2021/0027455 A1* | 1/2021 | Kimizuka | ............. H01J 37/222 |
| 2021/0374936 A1* | 12/2021 | Koopman | ......... G06F 18/24133 |

FOREIGN PATENT DOCUMENTS

| | | | | |
|---|---|---|---|---|
| WO | 200218266 A1 | 3/2002 | | |
| WO | 2018015809 A2 | 1/2018 | | |
| WO | WO-2019060999 A1 * | 4/2019 | ............. | B82Y 10/00 |

\* cited by examiner

METHOD FOR AUTONOMOUSLY APPLYING A DANGLING BOND PATTERN TO A SUBSTRATE

RELATED APPLICATIONS

This application claims priority benefit of U.S. Provisional Application Ser. No. 62/806,381 filed on Feb. 15, 2019, the contents of which are hereby incorporated by reference.

FIELD OF THE INVENTION

The present invention is directed in general to atomic structures, and in particular to manufacturing of atomic structures based on machine learning technology to locate surface features on a substrate and pattern predefined atomic structures in defect-free areas of the surface to provide automated atomic scale fabrication.

BACKGROUND

With the miniaturization of complementary metal-oxide-semiconductor (CMOS) technology approaching its fundamental limit, alternatives built at an atomic level have been developed such as those disclosed in U.S. patent application Ser. No. 16/318,262.[1,2,3]

Scanning probe microscopes (SPMs) are a family of tools used to make images of nanoscale surfaces and structures, including atoms. They use a physical probe to scan back and forth over the surface of a sample. During this scanning process, a computer gathers data that is used to generate an image of the surface. There are several types of SPMs. Atomic force microscopes (AFMs) measure the electrostatic forces between the cantilever tip and the sample. Magnetic force microscopes (MFMs) measure magnetic forces. Scanning tunneling microscopes (STMs) measure the tunneling current flowing between the tip and the sample.

An SPM has a probe tip that can be sharpened to a single atom. The tip is translated and modulated in height precisely across the surface, even on a scale of atom by atom. When the tip is near the sample surface, SPMs can measure tip-surface interactions caused by many kinds of effects, including tunneling current, electrostatic forces, magnetic forces, chemical bonding, van der Waals forces, and capillary forces. SPMs can detect differences in height that are a fraction of a nanometer or about the diameter of a single atom. A computer combines the data to create an image.

In addition to visualizing nanoscale structures, SPMs are used to manipulate individual atoms and molecules and move them to make specific patterns.

Scanning Probe Microscopy (SPM) has proven to be useful tool for several different varieties of atom-scale device fabrication including spin-based logic using Fe atoms on a Cu(111) surface,[4] single-atom transistors using phosphorus dopants in silicon,[5] and binary atomic wires and logic gates using dangling bonds (DBs) on hydrogen-terminated silicon (H—Si).[6] Hydrogen desorption, on the H—Si surface allows creation of DB based circuits for next generation ultimately miniaturized low power nanoelectronic devices beyond complementary metal oxide semiconductor(CMOS) technology.

Hydrogen-terminated silicon surfaces are a promising platform for atomic circuitry. The attractive properties of hydrogen-terminated silicon illustratively include inertness, thermal stability, low defect densities, and unique attributes of the silicon surface dangling bonds. Fundamental properties of isolated dangling bonds have been studied extensively. It has been shown that they are electronically isolated from the host substrate and can hold charge, thereby acting as atomistic quantum dots that are amenable to being precisely placed and erased. Various functional elements such as quantum-cellular-automaton cells, binary transmission wires, and binary computational gates can be made by arranging dangling bonds close to each other. Dangling bonds on the H—Si surface have been shown to be rewritable[11,12,13] as well as stable at room temperature[14,15] making them an excellent candidate for atom scale devices.

The H—Si surface has found applications in the study of surface chemistry including self-directed growth of ordered multi-molecular lines[16,17] as well as reaction energetics.[18] The controllable desorption of hydrogen from the H—Si (100)-2×1 surface using the probe tip of a scanning tunneling microscope (STM),[19] allowed for more precise studies of surface chemistry[20] as well as fabrication of rudimentary devices.[21,22] With the continued study of DBs on H—Si surfaces, more complex and realizable devices have been developed.

In principle, the capacity of this technology provides smaller, more efficient, faster and cheaper electronics compared to the currently dominant CMOS technology. Despite the progress made in the design of these and other device concepts,[7,8,9,10] reliable device fabrication is usually limited by either inaccuracy or variability in the fabrication process. If these devices are to be commercially viable, they must be built in a way that allows fast, parallelized, and automated fabrication.

Until now, complete automation of device fabrication has been limited by three major factors. The first is the continual monitoring of probe quality needed to ensure the probe is kept in an atomically sharp patterning condition. This step was recently automated using machine learning as disclosed in U.S. Provisional Application No. 62/644,974.[23] The second is automated patterning error detection and correction through the recently realized controlled hydrogen repassivation technique.[12] The third is the automated characterization and localization of defects on the H—Si(100)-2×1 surface.

Defects found on hydrogen-terminated samples can take the form of sub-surface or surface charge centers which can affect the operation of nearby electric field sensitive atomic devices, or as non-charged surface irregularities which limit the space available for patterning. Locating and characterizing of defects is quite labor intensive and depends on the random distribution of these defects and the cleanliness of the terminated sample. Initial attempts have been made to automate surface defect recognition using fast Fourier transforms;[24] however, the characterization of defects was limited to a few of many different species. More recently, machine learning has been applied to assist in classification and analysis of surface structures using SPM;[25,26,27] however, it has yet to be applied to the H—Si(100)-2×1 surface.

Thus, there exists a need for automated characterization and localization of defects on the H—Si(100)-2×1 surface to allow for a commercially feasible way to mass produce electronic components with atomic precession; all with limited human intervention.

SUMMARY OF THE INVENTION

The present invention provides a method for autonomously applying a dangling bond pattern to a substrate for atom scale device fabrication. The autonomous application method includes inputting the pattern to be applied to the substrate and initiating a patterning process. Next the substrate is scanned using a scanning probe microscope (SPM) to generate an SPM image of the substrate. The SPM image is fed into a trained convolution neural network (CNN) and analyzed using the CNN to identify defects on the substrate. Based on the CNN analysis of the SPM image a suitable defect free area on the substrate is determined for application of the pattern. Finally, the pattern is applied to the substrate in the suitable defect free area.

The present invention also provides an atom scale electronic component that includes a plurality of functional patches on a substrate, each of the plurality of functional patches containing a dangling bond pattern, and a plurality of wires electrically connecting the plurality of functional patches.

The present invention also provides a method for training a convolution neural network (CNN) to assess the quality of a surface of a substrate for atom scale device fabrication. The training method includes recording a Scanning Tunneling Microscope (STM) image of the surface of the substrate, extracting a plurality of images of defects in the surface from the STM image, labeling pixel-wise each of the plurality of images of the defects, and feeding the extracted and labeled plurality of images of defects into a convolution neural network one image at a time to train the CNN for semantic segmentation.

BRIEF DESCRIPTION OF THE DRAWINGS

The present invention is further detailed with respect to the following drawings that are intended to show certain aspects of the present invention but should not be construed as a limit on the practice of the present invention.

DESCRIPTION OF THE INVENTION

The present invention has utility as a system and method for automated atomic scale fabrication capable of characterizing and locating defects on the H—Si(100)-2×1 surface to allow for a rapid and commercially feasible way to mass produce electronic components with atomic precession with limited human intervention. The present invention implements an encoder-decoder type convolutional neural network (CNN)[28,29,30] to locate and classify features on the substrate surface. By using semantic segmentation,[31,32] the neural network is trained to recognize a variety of defects commonly found on the H—Si(100) surface. After implementing the model with existing patterning,[13] and probe tip forming suites,[23] full automation of the patterning process is achieved.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

Crystalline silicon is tetravalent and forms a diamond lattice; each silicon atom shares 4 bonds, two above and two below the atom. At the surface, two of these bonds are unsatisfied so the crystal reorganizes to a lower energy configuration. The addition of atomic hydrogen to the silicon surface during the annealing process results in the formation of one of three possible phases. The likelihood of forming these phases can be controlled by the annealing temperature at which the sample is prepared. The 2×1 phase forms at ~377° C., the 3×1 phase forms at ~127° C., and the 1×1 phase forms below ~20° C.[33,14,34] The most regularly used for DB patterning is the 2×1 phase reconstruction where each surface atom pairs with a neighboring surface atom to create a dimer pair. The dimer pairs form in rows which run parallel to each other across the surface. Each silicon atom at the surface is left with a single unsatisfied bond which extends out into vacuum and can either be terminated with hydrogen or left vacant creating a dangling bond. Although the preparation of the H—Si(100)-2×1 phase is well understood, it is often difficult to create a perfectly clean, defect free surface. These defects as well as clean H—Si(100) can be imaged using a STM.

Figure 1A:
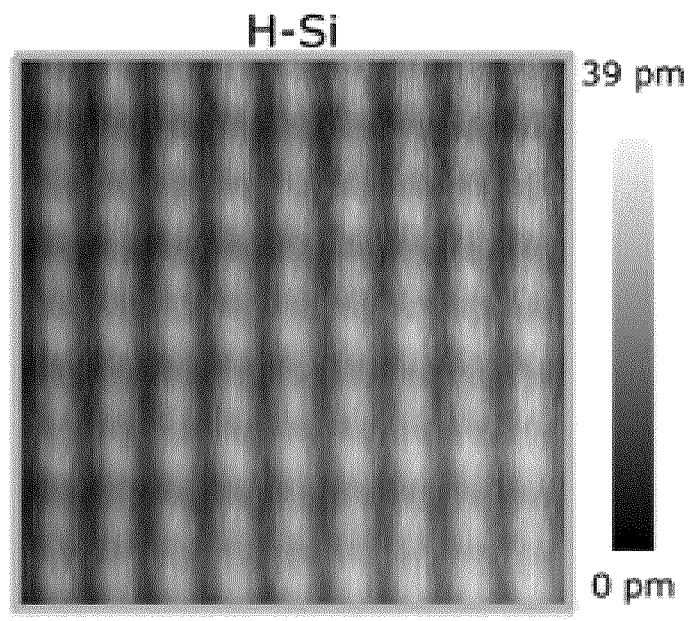
FIGS. 1A-1L show 4×4 nm$^2$ images taken with an STM with a sample bias of 1.4 V and 50 µA each showing empty state images of various defects found on a typical H—Si (100) surface.
Figure 1B:
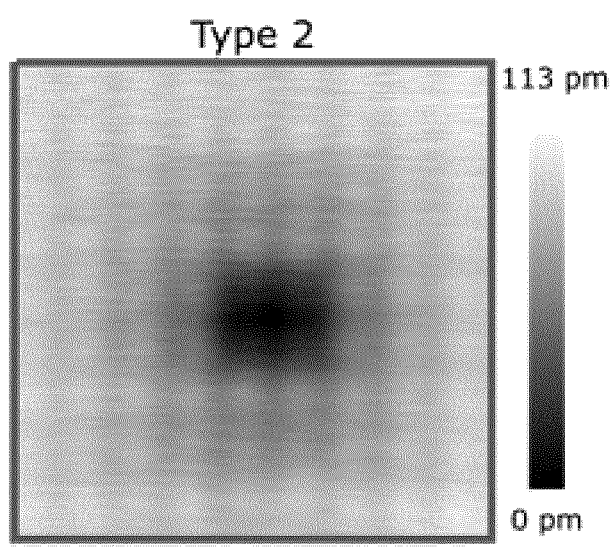
Figure 1C:
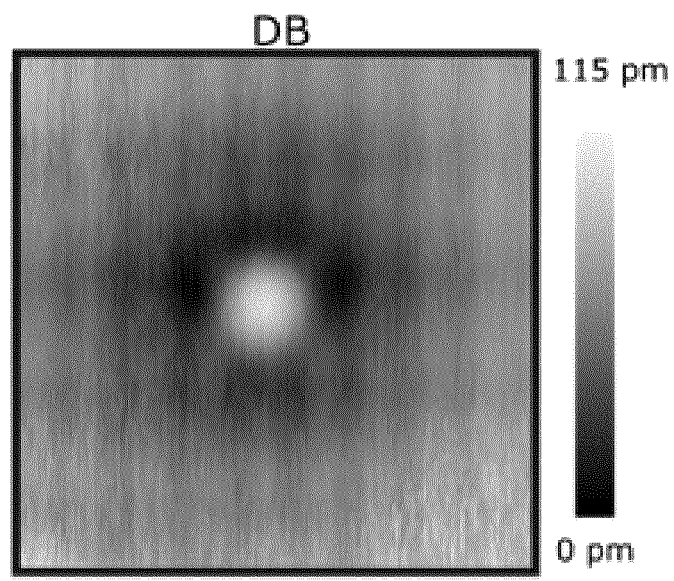
Figure 1D:
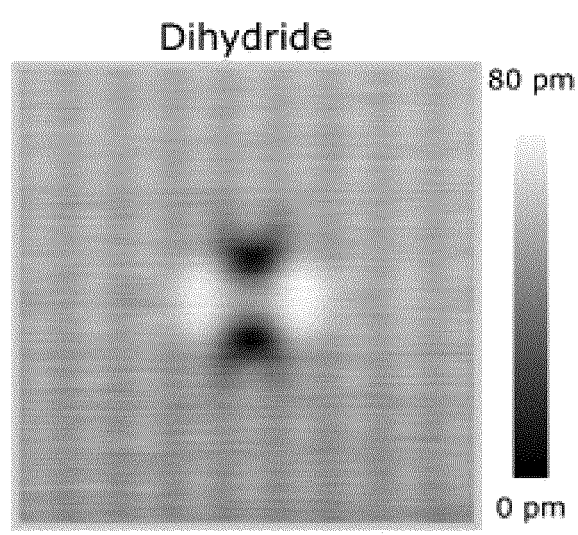
Figure 1E:
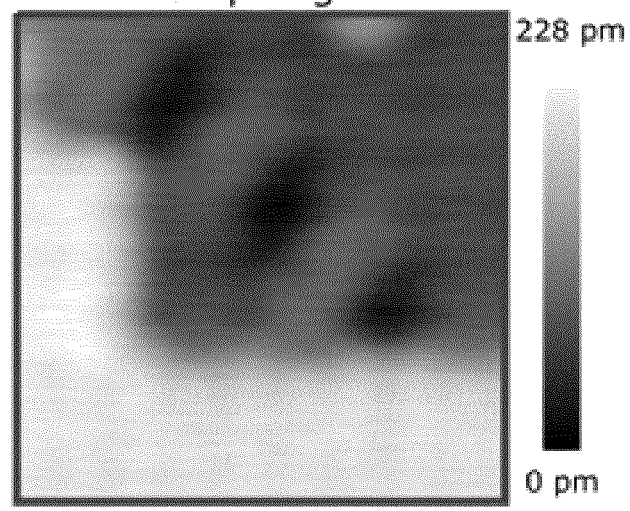
Figure 1F:
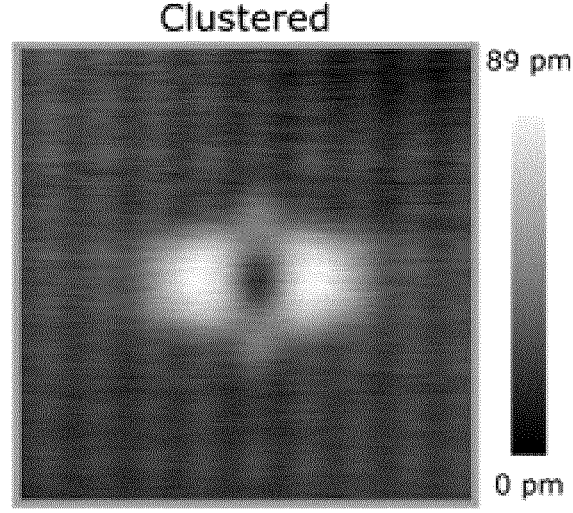
Figure 1G:
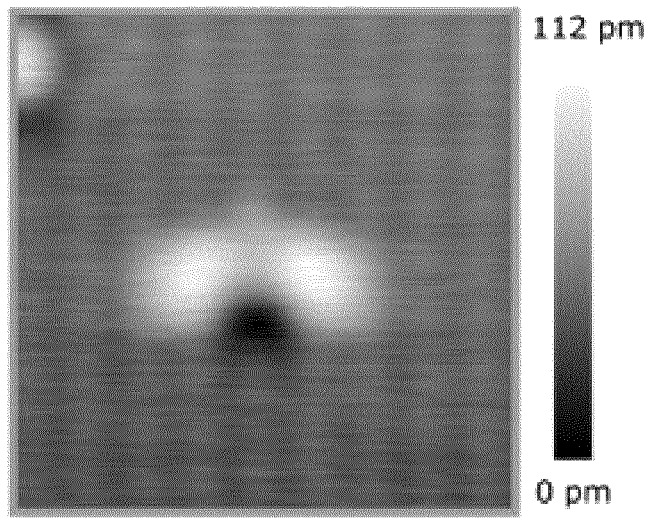
Figure 1H:
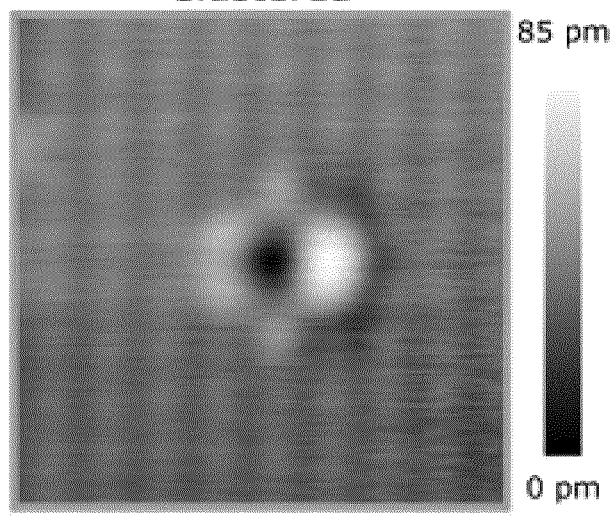
Figure 1I:
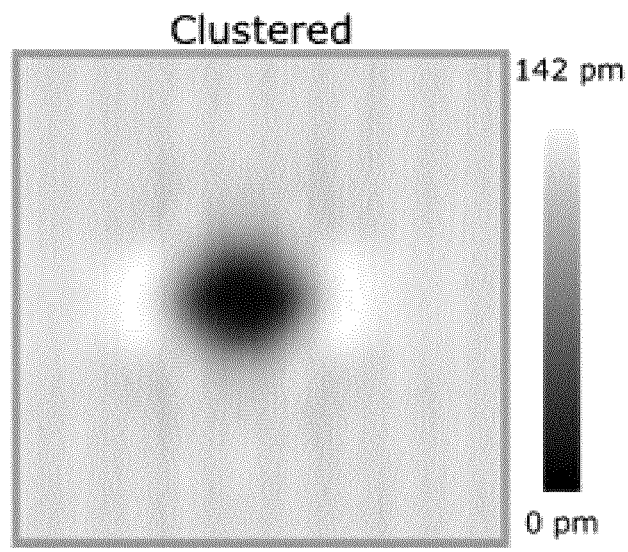
Figure 1J:
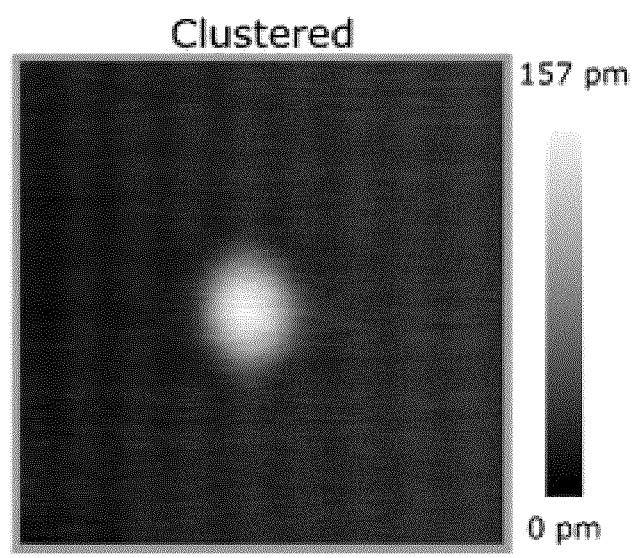
Figure 1K:
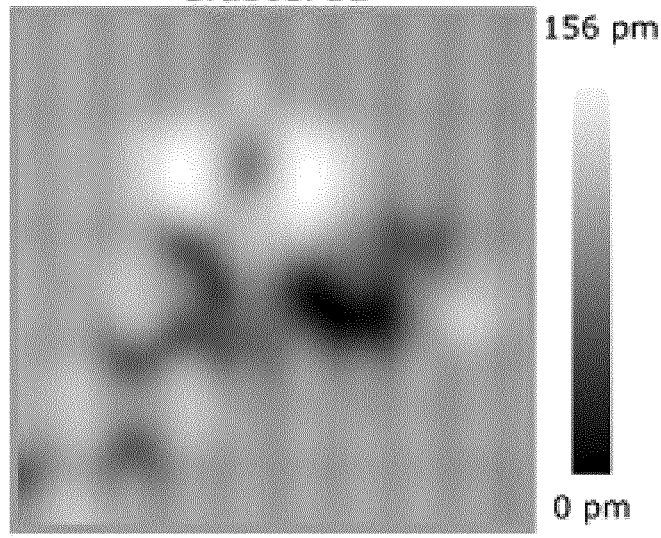

In order to train the CNN to recognize these surface defects, the defects are labeled pixel-wise in the STM images. The neural network is trained with seven different classes of labels. The first is regular, clean H—Si(100)-2×1, as shown in FIG. 1A. FIG. 1B shows two types of charged defects labelled 'type 2'[35], the origin of which is unconfirmed. FIG. 1C shows 'DB' or dangling bond[19,36]. The remainder of the known surface defects are thought to exist in a neutral charge state and consist of diversely reconstructed H—Si, adatoms, and adsorbed molecules. FIG. 1D shows a 'dihydride' in which two silicon atoms each bind to 2 hydrogen atoms instead of forming a dimer pair[37]. FIG. 1E shows a 'step-edge' which is a drop in the surface height by one atomic layer. Dimer rows run perpendicular to the original direction above the step and the boundary of the step edge is often marked with 1×1 or 3×1 reconstruction.[38,39,40] FIGS. 1F-K show several different defects that either appear infrequently or are often found close to other defects, rendering them difficult to properly isolate for labelling.

Figure 1L:
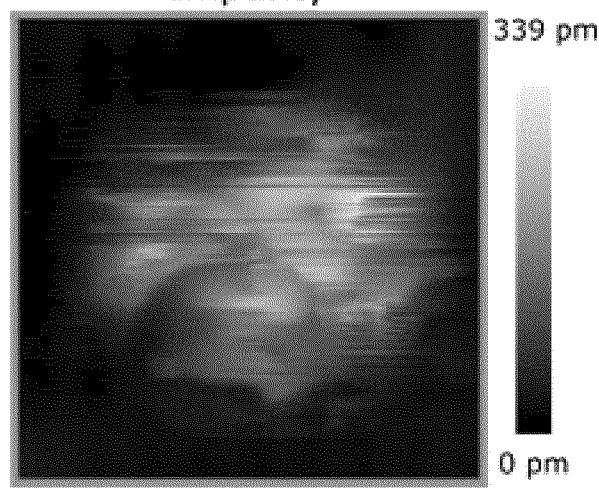

These defects and any others that were unknown were given the label 'clustered'. FIG. 1L shows the final label class, an adsorbed species, molecule, or cluster of atoms of unknown origin labelled as 'impurity'. These defects are thought to be something other than H—Si and can usually be reduced by eliminating any potential contaminants during sample preparation.

Figure 2:
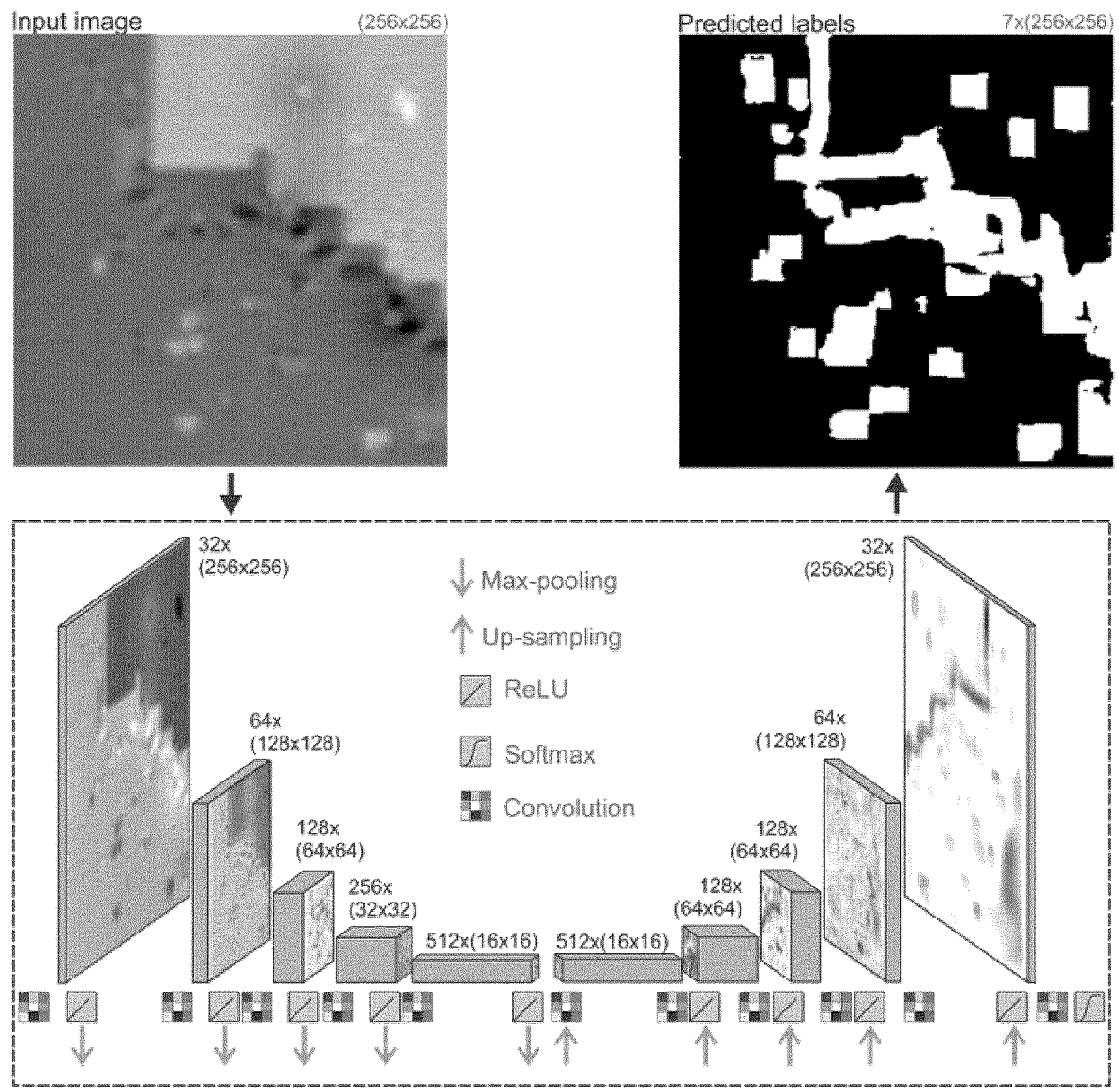
FIG. 2 shows an embodiment of a CNN architecture according to the present invention, the CNN including 5 convolutional encoder layers followed by 5 convolutional decoder layers, each of the encoder and decoder layers having a 'relu' activation function applied, and wherein the final set of images is passed through one final convolutional layer followed by a softmax activation giving 7 separate images corresponding to each of the 7 labels with the output displaying the clean H—Si areas in black.

After the training data is acquired and labeled, as described in the experimental methods below, it is used to develop and train the CNN for semantic segmentation. Semantic segmentation allows for both the localization and classification of objects in images. This can be used in many applications where the network must make a distinction between different objects in an image including use in self-driving cars[41,42,43] and medical image analysis.[44,45,46] Here, a distinction is made between the pixels that make up each of the labelled defects. The various CNN architectures are trained. The CNN architecture that shows the greatest performance in recognizing the defects is implemented, as shown in FIG. 2. An image of the surface is given as the input with a resolution of ~10 pixels/nm. The image is then passed through 5 different decoder layers. Each layer consists of a convolutional filter (3×3 kernel). The number of filters is doubled for each layer starting with 32. A batch normalization is then applied to maintain a mean activation threshold of 0. An activation is applied using a rectified linear unit (relu) which sets all pixels with a negative value to 0. A max pooling downsampling (2×2 kernel) is finally applied which reduces the area of the image by a factor of 4. The smallest downsampled data set consists of 512 images that are 0.4% the size of the original image. The images are then passed through 5 subsequent encoder layers which bring the image size back to the same number of pixels as the original input. Each layer is structured similarly to the decoder layers except the downsampling function is replaced with an upsampling function which uses nearest-neighbour sampling (2×2 kernel) to increase the image size by a factor of 4. Label segmentation may be slightly improved if the upsampling is unpooled using learned indices from the max pooling of the same image size. The final set of 32 images is passed through a final convolution layer of seven filters each corresponding to one of the labelled classes. The resulting labelled images are passed through a softmax activation filter which normalizes the pixel values to correspond with a probability of label accuracy.

Figure 9:
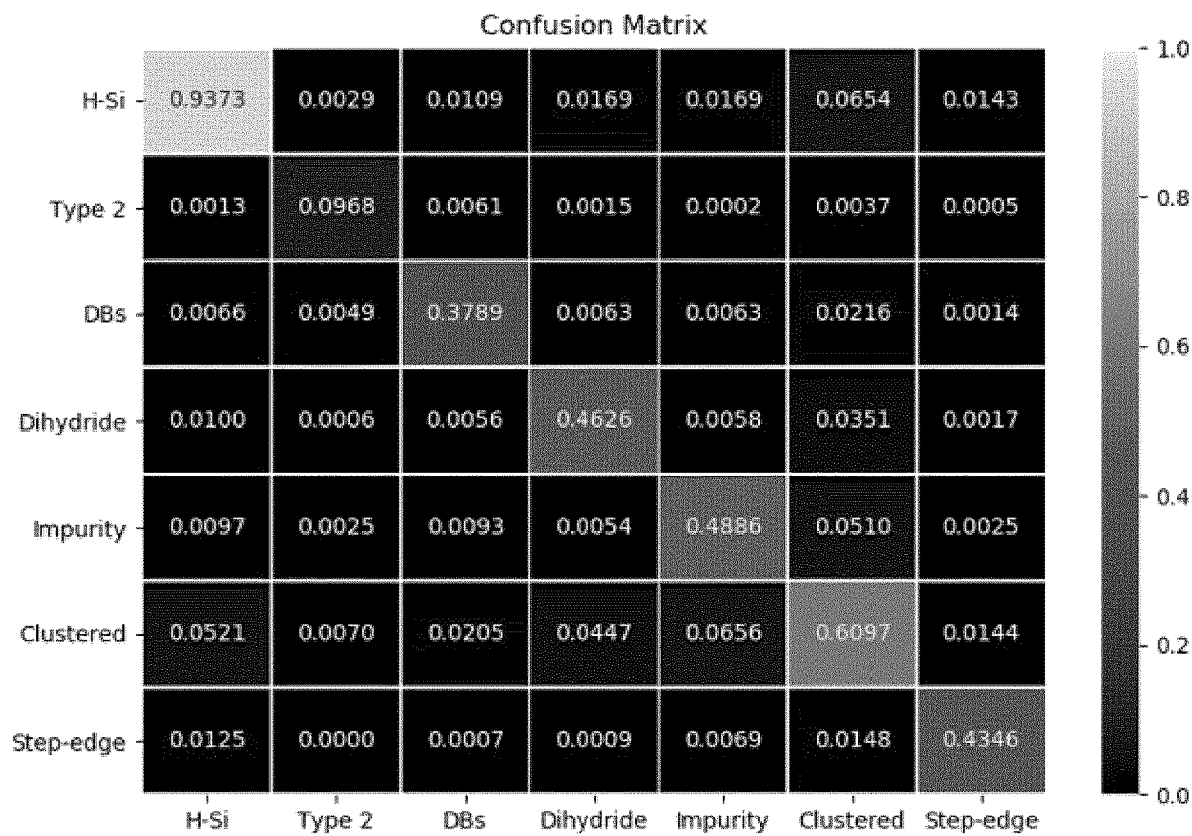
FIG. 9 shows a confusion matrix mapping the Dice coefficient for each of the predicted defects.

The network training data set is made from 28 images (100×100 $nm^2$ and a resolution of 1028×1028). Each of the 28 images is divided into 64 smaller images (128×128). Each of the smaller images is rotated by 90°, 180°, and 270° as well as flipped along its axis and rotated again increasing the data set by a factor of 8 resulting in a total of 14336 images. The images are divided into training, testing, and validating images at a ratio of ~2/3:1/6:1/6 respectively (corresponding to 9560:2384:2392 images). The Adam optimization algorithm[47] is utilized with an exponentially decaying learning rate to achieve better convergence on a local minimum. The loss function used is a soft Dice loss function[48]. The soft Dice loss function is preferably used above other loss functions[49,29] because it removes the need to weight different labels that appear less frequently. This solves any class imbalance which may otherwise be caused given that clean H—Si appears much more frequently than all other classes. FIG. 9 shows a confusion matrix mapping the Dice coefficient for each of the predicted defects.

Figure 3:
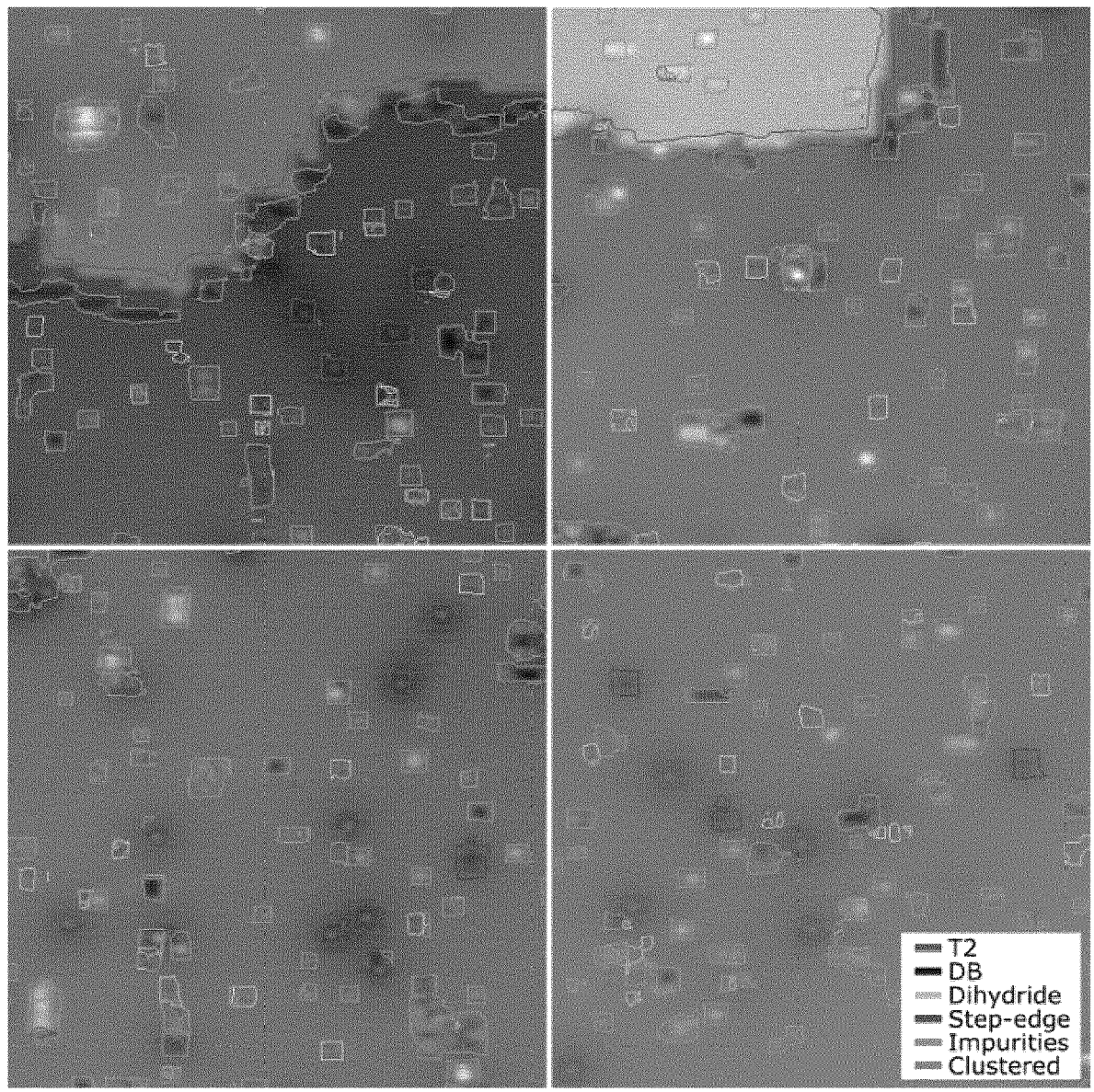
FIG. 3 shows original input 40×40 nm$^2$ images (constant current of 50 µA and 1.4 V) with traces of the outputs outlined, where T2 defects are traced in purple, DBs in blue, dihydrides in yellow, step-edges in red, impurities in green, and clustered defects in orange.
Figure 4:
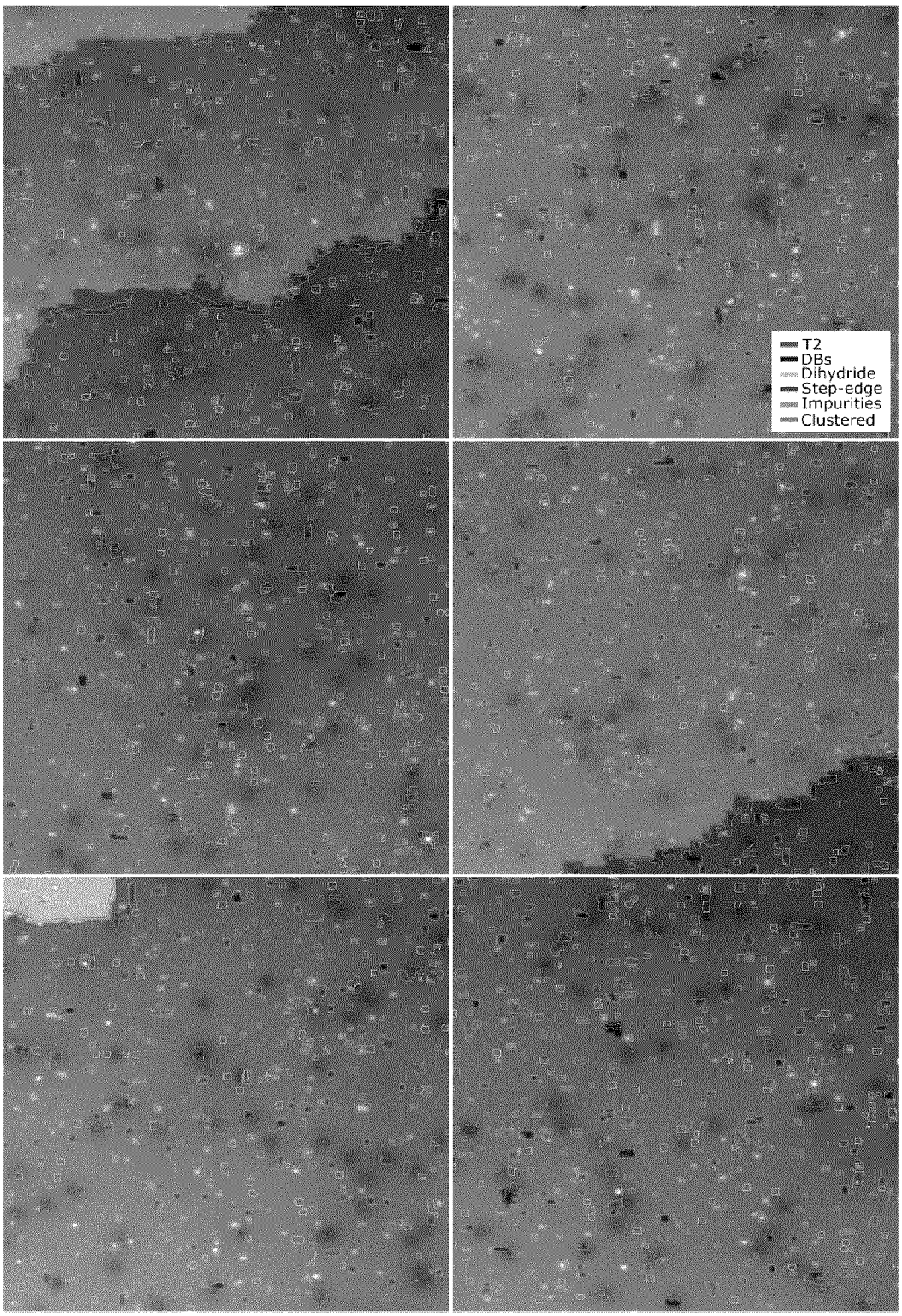
FIG. 4 shows original input 100×100 nm$^2$ images with traces of the outputs outlined, where T2 defects are traced in purple, DBs in blue, dihydrides in yellow, step-edges in red, impurities in green, and clustered defects in orange.
Figure 5:
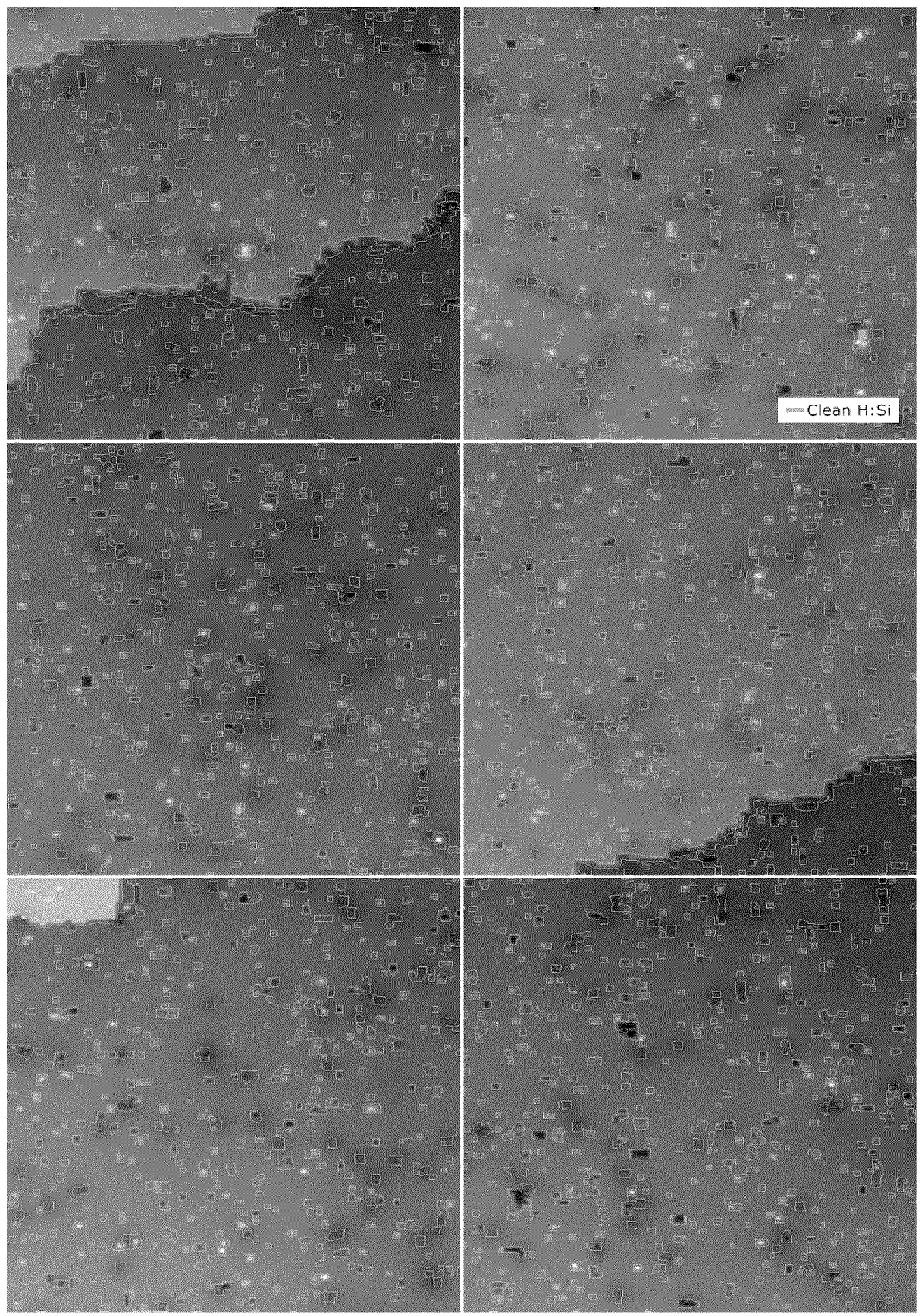
FIG. 5 shows original input 100×100 nm$^2$ images with traces of clean H—Si outlined in teal.

A subset of the outputs of the fully trained CNN is shown in FIG. 3. The clean H—Si label is left out of FIG. 3 because it makes it difficult to see the boundaries of the defects. More examples of the predicted output labels including H—Si can are shown in the FIG. 4 and FIG. 5. The overall Dice coefficient score of the model is recorded at 84%. A large portion of the 16% inaccuracy is explained by subjectivity in labeling data without the use of a standard defect size established. The majority of the defects are seen to be correctly identified at the center of the defect, but correct identification is reduced further from the defect center. Accuracy of prediction is increased when the criteria of defects are standardized for the various labels applied. Generally, the size scale of the DB patterns is much larger than the size scale of any variations in the defect labels.

Figure 6A:
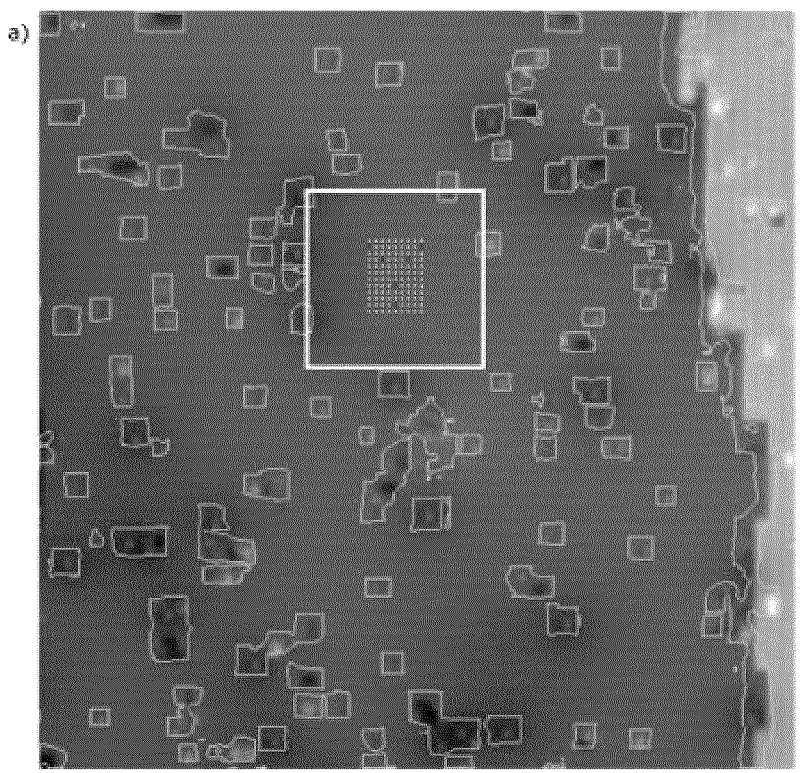
FIG. 6A shows an image with clean H—Si areas traced in teal, they are identified by the square inset showing the cleanest area that is suitable for pattern application.
Figure 6B:
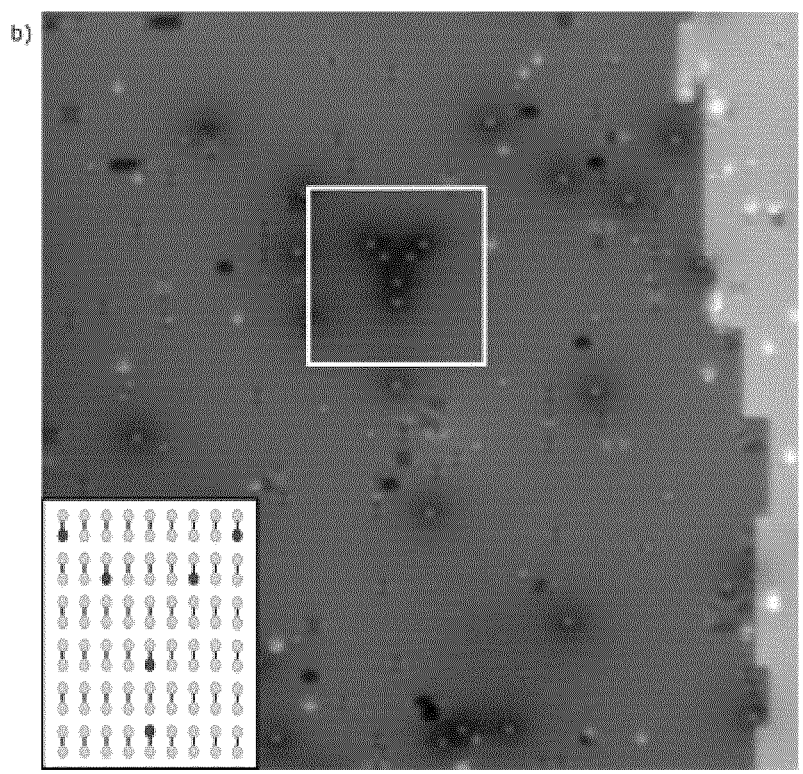
FIG. 6B shows an image of the surface shown in FIG. 6A after the pattern is applied within the square inset.
Figure 7A:
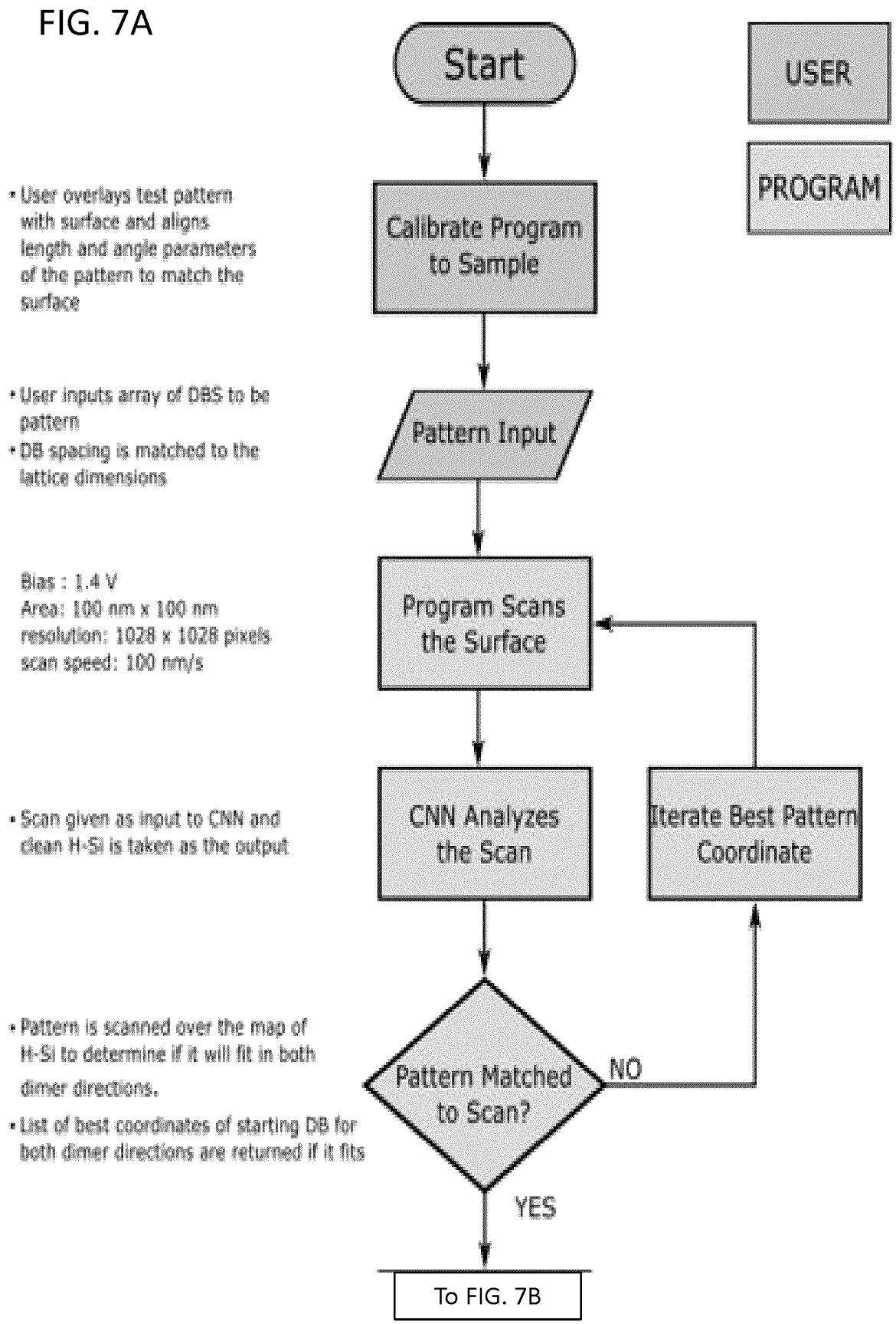
FIGS. 7A-7C show a logic flow chart of a patterning program according to embodiments of the present invention.
Figure 7B:
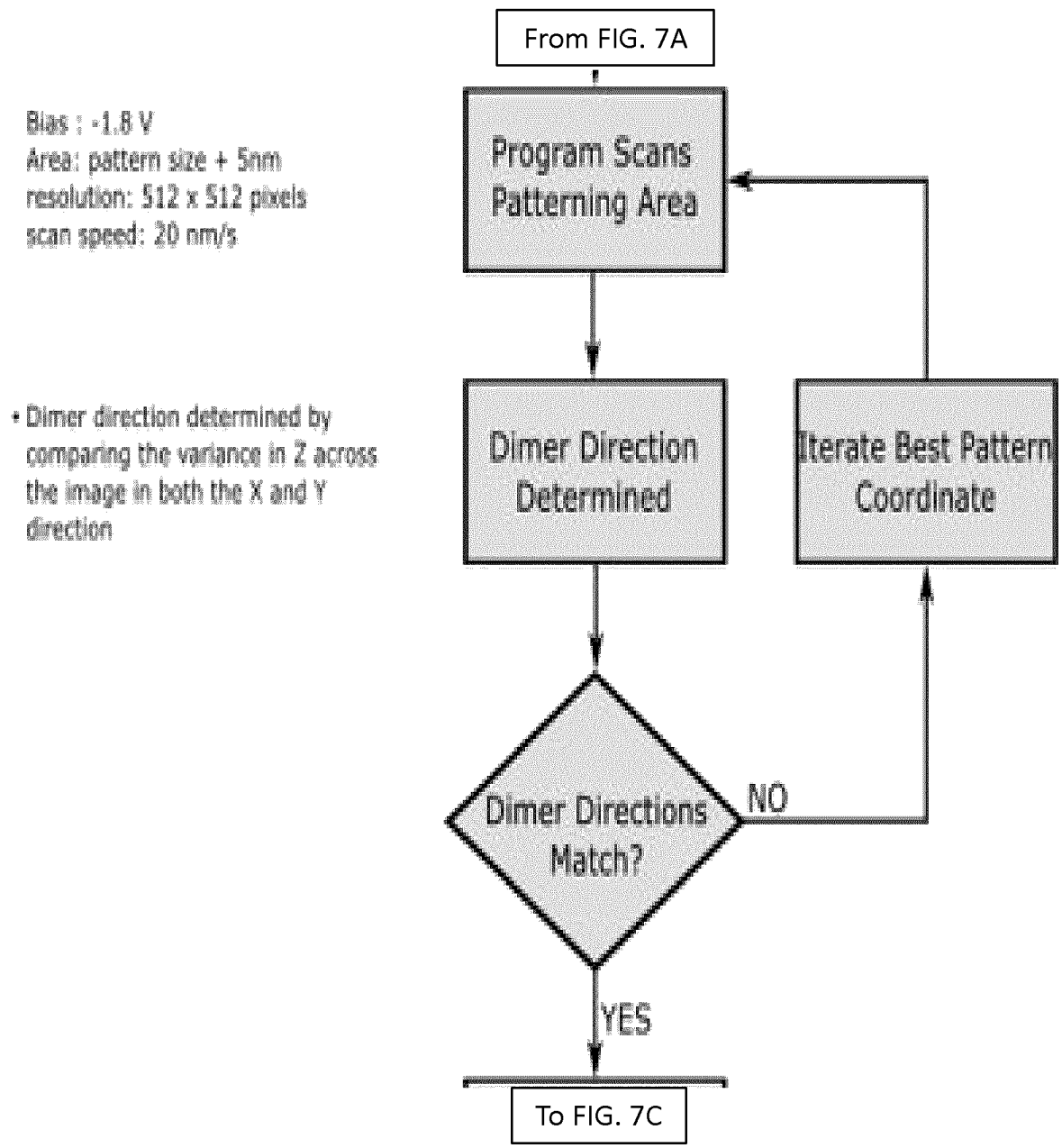
Figure 7C:
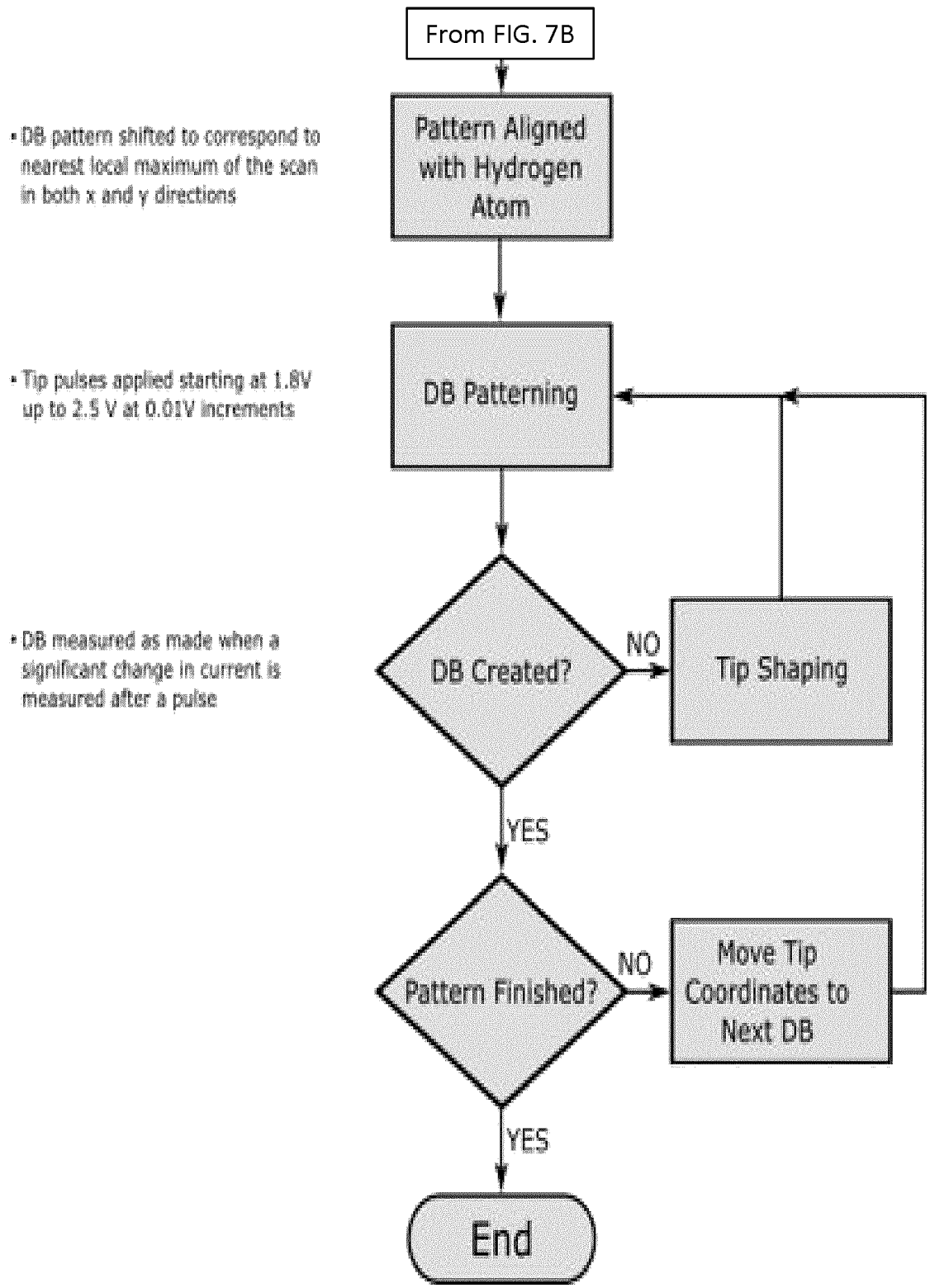
Figure 8:
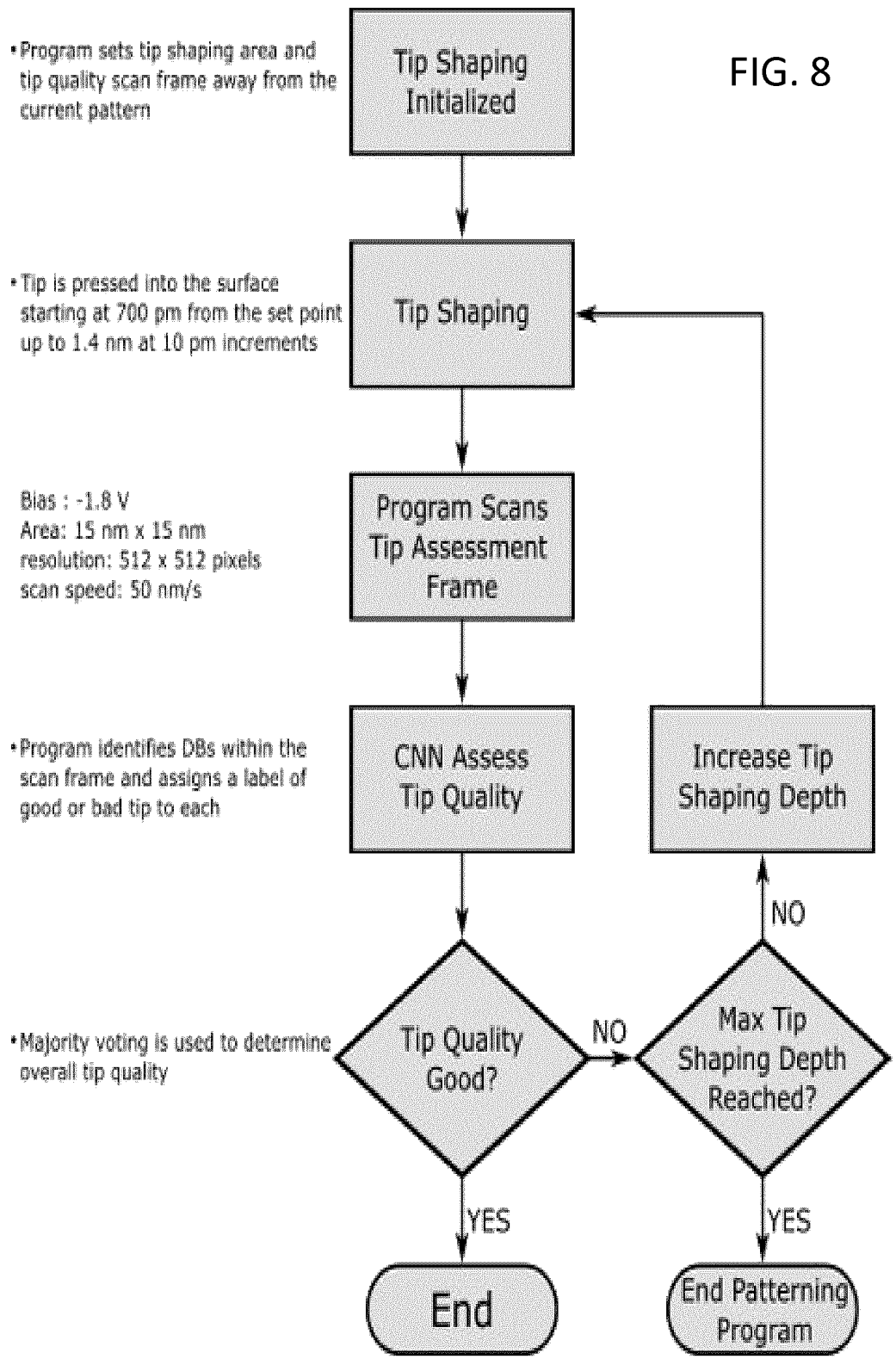
FIG. 8 shows a logic flow char of a tip shaping sub routine according to embodiments of the present invention.

With the successful development of the neural network, specifically in locating charged defects, as well as clean H—Si, the CNN is implemented in the automation of DB patterning. FIGS. 6A and 6B demonstrate the current automation process. According to embodiments, a user inputs a specific pattern they wish to create, for example an OR gate pattern is input. The patterning process is then initiated. The SPM controller is then programmed to take a scan of the sample with a resolution similar to the training data. The image is fed to the neural network and the output image containing the location of clean H—Si is returned. The program then finds the largest patch of clean H—Si that would support the pattern, as shown in the inset of FIG. 6A. Once found, the program begins patterning until it is complete, as shown in FIG. 6B. A full flow chart of the patterning program is shown in FIGS. 7A-7C and FIG. 8. The same procedure is also applied for more complicated fabrication schemes.

Accordingly, the present invention provides a routine that can assess the quality of a sample and executes a device manufacturing procedure in an area that is free of defects to fully develop atomically-precise fabrication tools. This routine relies on the use of a CNN which uses semantic segmentation to identify and locate certain defects that inhibit the manufacturing process. The neural network is trained with images of defects commonly found on the H—Si(100)-(2×1) surface. It is envisioned that defect-free regions, or patches, adequate for fabrication of functional logic units comprised of roughly one hundred atoms will exist and that interconnections between such units will be custom routed so as to avoid defects. According to embodiments, defect-free regions, or patches, are somewhat disconnected by unused and or defective areas. Small functional circuit units are made in the patches identified by the machine and have wires interconnecting the patches to make larger function circuits. The wire paths may be determined on the fly, with each wire routed to avoid microscopic defects between good patches. In this way, defect-free surface areas are connected to form larger, effectively defect-free circuit blocks. The techniques shown here have applications in device fabrication using any form of scanning probe microscopy as well as subsets of semiconductor device fabrication where the quality of the materials used must be assessed to optimize the fabrication process.

EXAMPLES

The following experiments are performed using an Omicron LT STM operating at 4.5 K and ultrahigh vacuum ($4 \times 10^{-11}$ Torr). Tips are electrochemically etched from polycrystalline tungsten wire and resistively heated in ultrahigh vacuum to remove surface adsorbates and oxide, and sharpened to a single atom tip using field ion microscopy[46]. In situ tip processing is performed by controlled tip contact with the surface[6,47,48]. Tip shaping parameters are the same as those detailed in incorporated Reference 29 below[29].

Samples used are highly arsenic doped ($1.5 \times 10^{-19}$ atoms/$cm^3$) Si(100). Samples are degassed at 600° C. overnight followed by flash annealing at 1250° C. The samples are then terminated with hydrogen by exposing them to atomic hydrogen gas at 330° C.

Image and data acquisition are done using a Nanonis SPM controller and software. All training data is acquired at an imaging bias of either 1.3 V or 1.4 V with a tunneling current of 50 µA. The patterning automation routine is programmed in Python and Labview using the Nanonis programming interface library.

The CNN is implemented using Keras (2.1.3) with TensorFlow backend. Data was labelled using LabelMe (1.0) software.

References and patent documents cited herein are incorporated by reference to the same extent as if each reference was individually and explicitly incorporated by reference.

As a person skilled in the art will recognize from the previous detailed description and from the figures and claims, modifications and changes can be made to the preferred embodiments of the invention without departing from the scope of this invention defined in the following claims.

REFERENCES

[1] Floris A. Zwanenburg, Andrew S. Dzurak, Andrea Morello, Michelle Y. Simmons, Lloyd C L Hollenberg, Gerhard Klimeck, Sven Rogge, Susan N. Coppersmith, and Mark A. Eriksson. Silicon quantum electronics. Reviews of Modern Physics, 85(3):961{1019, 2013.

[2] Dieter K. Schroder. Semiconductor Material and Device Characterization. John Wiley & Sons, Inc., Hoboken, N.J., USA, October 2005.

[3] Enrico Prati and Takahiro Shinada. Atomic scale devices: Advancements and directions. Tech-nical Digest—International Electron Devices Meeting, IEDM, 2015-Februa (February): 1.2.1 {1.2.4, 2015.

[4] Alexander Ako Khajetoorians, Jens Wiebe, Bruno Chilian, and Roland Wiesendanger. Realizing All-Spin-Based Logic Operations Atom by Atom.

[5] Martin Fuechsle, Jill a Miwa, Suddhasatta Mahapatra, Hoon Ryu, Sunhee Lee, Oliver Warschkow, Lloyd C L Hollenberg, Gerhard Klimeck, and Michelle Y Simmons. A single atom transistor. Nature nanotechnology, 7(4): 242{6, 2012.

[6] Taleana R Huff, Hatem Labidi, Mohammad Rashidi, Mohammad Koleini, Roshan Achal, Mark H Salomons, and Robert A Wolkow. Atomic White-Out: Enabling Atomic Circuitry through Mechanically Induced Bonding of Single Hydrogen Atoms to a Silicon Surface. ACS Nano, 11:8636{8642, 2017.

[7] F. E. Kal, M. P. Rebergen, E. Fahrenfort, J. Girovsky, R. Toskovic, J. L. Lado, J. Fernandez-Rossier, and A. F. Otte. A kilobyte rewritable atomic memory. Nature Nanotechnology, 11(11):926{929, November 2016.

[8] A. Imre, G. Csaba, L. Ji, G. Orlov, G. H. Bernstein, and W. Porod. Majority Logic Gate for Magnetic Quantum-Dot Cellular Automata. Science, 331(5758):205 {208, June 2006.

[9] Kai Sotthewes, Victor Geskin, Rene Heimbuch, Avijit Kumar, and Harold J W Zandvliet. Research Update: Molecular electronics: The single-molecule switch and transistor. APL Materials, 2(010701), 2014.

[10] Niko Pavlicek, Zsolt Majzik, Gerhard Meyer, and Leo Gross. Passivation of dangling bonds on hydrogenated Si(100)-2$$1: a possible method for error correction in hydrogen lithography. June 2017.

[11] Roshan Achal, Mohammad Rashidi, Jeremiah Croshaw, David Churchill, Marco Taucer, Taleana Huff, Martin Cloutier, Jason Pitters, and Robert A. Wolkow. Lithography for robust and editable atomic-scale silicon devices and memories. Nature Communications, 9(1):2778, December 2018.

[12] M. Baseer Haider, Jason L. Pitters, Gino A. DiLabio, Lucian Livadaru, Josh Y. Mutus, and Robert A. Wolkow. Controlled Coupling and Occupation of Silicon Atomic Quantum Dots at Room Temperature. Physical Review Letters, 102(4):046805, January 2009.

[13] G. P. Lopinski, D. D. M. Wayner, and R. A. Wolkow. Self-directed growth of molecular nanostructures on silicon. Nature, 406(6791):48{51, July 2000.

[14] Xiao Tong, Gino A Dilabio, and Robert A Wolkow. A Self-Directed Growth Process for Creating Covalently Bonded Molecular Assemblies on the HSi(100)-31 Surface. Nano Letters, 4(5):979{983, 2004.

[15] Alexander B Sieval, Ricarda Opitz, Huub P A Maas, Michael G Schoeman, Geert Meijer, Frank J Vergeldt, Han Zuilhof, and Ernst J R Sudholter. Monolayers of 1-Alkynes on the H-Terminated Si(100) Surface. Langmuir, 16(26):10359{10368, 2000.

[16] J. W. Lynding, T-C. Shen, G. C. Abelin, C. Wang, and J. R. Tucker. Nanoscale patterning and selective chemistry of silicon surfaces by ultrahigh-vacuum scanning tunneling microscopy. Nanotechnology, 7:128{133, 1996.

[17] S R Schofield, N J Curson, M Y Simmons, F J Rue, T Hallam, L Oberbeck, and R G Clark. Atomically Precise Placement of Single Dopants in Si. Physical Review Letters, 91(13), 2003.

[18] Robert. Wolkow. A Step Toward Making and Wiring Up Molecular-Scale Devices. Japanese Journal of Applied Physics To, 40:4378, 2001.

[19] J. R Tucker and T-C. Shen. Prospects for Atomically Ordered Device Structures Based of STM Lithography. Solid State Electronics, 42(7-8):1061 {1067, 1998.

[20] J N Randall, J R Von Ehr, J B Ballard, J H G Owen, and E Fuchs. Automated Scanning Tunneling Microscope image analysis of Si (100):H 2×1 surfaces. Microelectronic Engineering, 98:214{217, 2012.

[21] Mohammad Hadi Modarres, Rossella Aversa, Stefano Cozzini, Regina Ciancio, Angelo Leto, and Giuseppe Piero Brandino. Neural Network for Nanoscience Scanning Electron Microscope Image Recognition. Scientic Reports, 7(1):13282, December 2017.

[22] Maxim Ziatdinov, Artem Maksov, and Sergei V. Kalinin. Learning surface molecular structures via machine vision. npj Computational Materials, 3(1):31, December 2017.

[23] Maxim Ziatdinov, Ondrej Dyck, Artem Maksov, Xufan Li, Xiahan Sang, Kai Xiao, Raymond R. Unocic, Rama Vasudevan, Stephen Jesse, and Sergei V. Kalinin. Deep Learning of Atomically Resolved Scanning Transmission Electron Microscopy Images: Chemical Identication and Tracking Local Transformations. ACS Nano, 11(12): 12742 {12752, December 2017.

[24] Vijay Badrinarayanan, Alex Kendall, and Roberto Cipolla. SegNet: A Deep Convolutional Encoder-Decoder Architecture for Image Segmentation. arXiv, 2016.

[25] Jonathan Long, Evan Shelhamer, and Trevor Darrell. Fully convolutional networks for semantic segmentation.

[26] Hyeonwoo Noh, Seunghoon Hong, and Bohyung Han. Learning Deconvolution Network for Semantic Segmentation. In 2015 IEEE International Conference on Computer Vision (ICCV), pages 1520{1528. IEEE, December 2015.

[27] Jo~ao Carreira, Rui Caseiro, Jorge Batista, and Cristian Sminchisescu. Semantic Segmentation with Second-Order Pooling. pages 430{443. 2012.

[28] Ross Girshick, JeDonahue, Trevor Darrell, and Jitendra Malik. Rich Feature Hierarchies for Accurate Object Detection and Semantic Segmentation. In 2014 IEEE Conference on Computer Vision and Pattern Recognition, pages 580{587. IEEE, June 2014.

[29] Mohammad Rashidi and Robert A Wolkow. Autonomous Scanning Probe Microscopy in situ Tip Conditioning through Machine Learning. ACS Nano, 12:56, 2018.

[30] J. J. Boland. Structure of the H-Saturated Si(100) Surface. Phys. Rev. Lett., 65(26), 1990.

[31] Y J Chabal, Krishnan Raghavachari, and A Td'z. New Ordered Structure for the H-Saturated Si(1QQ) Surface: The (3×1) Phase. Technical Report 10, 1985.

[32] Kitiphat Sinthiptharakoon, Steven R Schoeld, Philipp Studer, Veronika BrazdovaBr, Cyrus F Hirjibehedin, David R Bowler, and Neil J Curson. Investigating individual arsenic dopant atoms in silicon using low-temperature scanning tunnelling microscopy. Journal of Physics: Condensed Matter J. Phys.: Condens. Matter, 26:8, 2014.

[33] S R Schoeld, P Studer, C F Hirjibehedin, N J Curson, G Aeppli, and D R Bowler. Quantum engineering at the silicon surface using dangling bonds. Nature Communications, 4:1649+, 2013.

[34] Yuji Suwa, Masaaki Fujimori, Seiji Heike, Yasuhiko Terada, Yoshihide Yoshimoto, Kazuto Akagi, Osamu Sugino, and Tomihiro Hashizume. First Principles Study of Dihydride Chains on H-Terminated Si(100)-2^A1 Surface. Japanese Journal of Applied Physics, 45(3B): 2200{2203, 2006.

[35] Masaaki Fujimori, Seiji Heike, Yuji Suwa, and Tomihiro Hashizume. Initial-Stage Dihydride Formation on Si(100)-2×1-H Surface. Japan Journal of Applied Physics, 42(11B):1387 {1390, 2003.

[36] Chris Pearson, Brian Borovsky, Michael Krueger, Robert Curtis, and Eric Ganz. Si(001) Step Dynamics. Physical Review Letters, 74(14):2710{2713, 1995. 3

[37] German Ros, Sebastian Ramos, Manuel Granados, Amir Bakhtiary, David Vazquez, and Antonio M Lopez. Vision-based Oine-Online Perception Paradigm for Autonomous Driving *. Technical report, 2015.

[38] German Ros, Laura Sellart, Joanna Materzynska, David Vazquez, and Antonio M Lopez. The SYNTHIA Dataset: A Large Collection of Synthetic Images for Semantic Segmentation of Urban Scenes. Technical report, 2016.

[39] Marvin Teichmann, Michael Weber, Marius Zollner, Roberto Cipolla, and Raquel Urtasun. MultiNet: Real-time Joint Semantic Reasoning for Autonomous Driving. In 2018 IEEE Intelligent Vehicles Symposium (IV), pages 1013{1020. IEEE, June 2018.

[40] Fausto Milletari, Nassir Navab, and Seyed-Ahmad Ahmadi. V-Net: Fully Convolutional Neural Networks for Volumetric Medical Image Segmentation. In 2016 Fourth International Conference on 3D Vision (3DV), pages 565 {571. IEEE, oct 2016.

[41] Geert Litjens, Thijs Kooi, Babak Ehteshami Bejnordi, Arnaud Arindra Adiyoso Setio, Francesco Ciompi, Mohsen Ghafoorian, Jeroen A. W. M. van der Laak, Bram van Ginneken, and Clara I. Sanchez. A survey on deep learning in medical image analysis. Medical Image Analysis, 42:60{88, December 2017.

[42] Eli Gibson, Wenqi Li, Carole Sudre, Lucas Fidon, Dzhoshkun I. Shakir, Guotai Wang, Zach Eaton-Rosen, Robert Gray, Tom Doel, Yipeng Hu, Tom Whyntie, Parashkev Nachev, Marc Modat, Dean C. Barratt, Sebastien Ourselin, M. Jorge Cardoso, and Tom Vercauteren. NiftyNet: a deep-learning platform for medical imaging. Computer Methods and Programs in Biomedicine, 158: 113{122, May 2018.

[43] Diederik P. Kingma and Jimmy Ba. Adam: A Method for Stochastic Optimization. December 2014.

[44] Carole H Sudre, Wenqi Li, Tom Vercauteren, Sebastien Ourselin, and M. Jorge Cardoso. Generalised Dice overlap as a deep learning loss function for highly unbalanced segmentations. July 2017.

[45] Olaf Ronneberger, Philipp Fischer, and Thomas Brox. U-Net: Convolutional Networks for Biomedical Image Segmentation. May 2015.

[46] Moh'd Rezeq, Jason Pitters, and Robert Wolkow. Tungsten nanotip fabrication by spatially controlled eld-assisted reaction with nitrogen. Journal of Chemical Physics, 124(20), 2006.

[47] Sam Jarvis, Adam Sweetman, Joseph Bamidele, Lev Kantorovich, and Philip Moriarty. Role of orbital overlap in atomic manipulation. PHYSICAL REVIEW B, 85:235305, 2012.

[48] Hatem Labidi, Mohammad Koleini, Taleana Huff, Mark Salomons, Martin Cloutier, Jason Pitters, and Robert A Wolkow. Indications of chemical bond contrast in AFM images of a hydrogen-terminated silicon surface. Nature Publishing Group, 8, 2017.

The invention claimed is:

1. A method for autonomously applying a dangling bond pattern to a substrate for atom scale device fabrication:
   inputting the pattern to be applied to the substrate;
   initiating a patterning process;
   scanning the substrate using a scanning probe microscope (SPM) to generate an SPM image of the substrate;
   feeding the SPM image into a trained convolution neural network (CNN) for semantic segmentation, wherein the CNN has been trained using images including a suitable region, a charged state defect region, and a neutral charge state defect region;
   analyzing the SPM image using the CNN to identify defects on the substrate;
   determining an area capable of supporting a pattern to be applied to the substrate as a suitable area on the substrate for application of the pattern; and
   applying the pattern of dangling bonds to the substrate in the suitable area.

2. The method of claim 1 wherein the substrate is hydrogen-terminated Si (100) surface.

3. The method of claim 1 wherein the SPM image has a resolution of 10 pixels/nm.

4. The method of claim 1 wherein identifying defects on the substrate includes characterizing defects on the substrate.

5. The method of claim 1 wherein identifying defects on the substrate includes locating defects on the substrate.

6. The method of claim 1 wherein analyzing the SPM image includes pixelating the image.

* * * * *